United States Patent [19]

Russin et al.

[11] 4,010,145
[45] Mar. 1, 1977

[54] PROCESS AND CATALYST INHIBITOR SYSTEMS FOR PREPARING SYNTHETIC LINEAR POLYESTERS

[75] Inventors: Nicholas C. Russin; Ronald A. Tershansy; Charles J. Kibler, all of Kingsport, Tenn.

[73] Assignee: Eastman Kodak Company, Rochester, N.Y.

[22] Filed: Mar. 1, 1976

[21] Appl. No.: 662,672

Related U.S. Application Data

[63] Continuation-in-part of Ser. No. 576,415, May 12, 1975, Pat. No. 3,962,189, and a continuation-in-part of Ser. No. 519,953, Nov. 1, 1974, abandoned.

[30] Foreign Application Priority Data

| Oct. 1, 1975 | Canada | 236847 |
| Oct. 30, 1975 | Germany | 2548630 |
| Oct. 30, 1975 | Italy | 28846/75 |
| Oct. 30, 1975 | Japan | 50-130951 |
| Oct. 31, 1975 | France | 75.33316 |
| Oct. 31, 1975 | United Kingdom | 45353/75 |

[52] U.S. Cl. ............ 260/75 R; 252/428; 252/429 R; 252/430; 252/431 R; 252/431 C; 252/431 N; 252/431 P
[51] Int. Cl.² .......................... C08G 63/14
[58] Field of Search ...... 260/75 R; 252/428, 429 R, 252/430, 431 R

[56] References Cited

UNITED STATES PATENTS

| 2,641,592 | 6/1953 | Hofrichter | 260/75 R |
| 3,749,697 | 7/1973 | Barkey | 260/75 R |
| 3,849,380 | 11/1974 | Jackson et al. | 260/75 R |
| 3,884,854 | 5/1975 | Ventura et al. | 260/75 R X |
| 3,899,522 | 8/1975 | Loeffler | 260/75 R X |
| 3,907,754 | 9/1975 | Tershansy et al. | 260/75 R |
| 3,962,189 | 6/1976 | Russin et al. | 260/75 R |

*Primary Examiner*—Howard E. Schain
*Assistant Examiner*—W. C. Danison, Jr.
*Attorney, Agent, or Firm*—D. B. Reece, III; William P. Heath, Jr.

[57] ABSTRACT

Catalyst-inhibitor system for the polymerization of poly(ethylene terephthalate) having excellent properties for fabrication of fibers and films. The catalyst-inhibitor system comprises a combination of organic or inorganic salts of manganese and cobalt; titanium alkoxides; an antimony compound; and a phosphate ester. This invention also is directed to an improved method of preparing synthetic linear polyesters utilizing the new catalyst-inhibitor system.

22 Claims, No Drawings

PROCESS AND CATALYST INHIBITOR SYSTEMS FOR PREPARING SYNTHETIC LINEAR POLYESTERS

This application is a continuation-in-part of application Ser. No. 576,415, filed May 12, 1975, now U.S. Pat. No. 3,962,189, which in turn is a continuation-in-part of application Ser. No. 519,953, filed Nov. 1, 1974, and which is now abandoned.

This invention relates to an improved method for preparing a synthetic linear polyester and to new and improved catalyst-inhibitor systems.

Poly(ethylene terephthalate) may be derived from a process comprising carrying out an ester interchange between ethylene glycol and dimethyl terephthalate to form bis-2-hydroxyethyl terephthalate which is polycondensed to poly(ethylene terephthalate) under reduced pressure and at elevated temperatures.

Difficulties have been encountered in the manufacture of poly(ethylene terephthalate) by the ester interchange reaction. Obviously, highly purified dimethyl terephthalate and highly purified glycol are preferred starting materials in order to form a uniform high quality product. However, even these highly purified materials are very sluggish with respect to ester interchange and in the case of less purified materials the reaction is too slow for practical commercial operation. Because of this slow rate of reaction it has been found essential, in commercial operation, to employ a suitable catalyst to speed up the reaction.

Many catalysts have heretofore been proposed for the ester interchange reaction in the manufacture of poly(ethylene terephthalate). These catalysts have not proven to be entirely satisfactory as fibers and filaments produced from the condensation polymers using said heretofore known catalysts do not possess the desired whiteness or lack of color. Therefore, there has been a great need in the art to find a catalyst system which not only speeds up the reaction into the realm of that considered necessary for economic purposes and which is useful over approximately the entire range of molecular weights desired in the finished polymer, but also, a catalyst which produces a condensation polymer of good color.

It is well-known that certain anthraquinone dyes can be metallized to give dull off-shade dyeings. It has been found that certain catalyst systems used for the preparation of polyesters can cause a bathochromic shift of the dye color during dyeing, or during subsequent yarn or fabric treatment. This leads to dull, undesirable colors, particularly when dyeing to pastel shades. Examples of shades that are adversely affected by this metallization process are C.I. Disperse Red 91, C.I. Disperse Blue 27, and C.I. Disperse Red 60. Many other hydroxy or amino anthraquinone dyes will also undergo a color shift when used to dye polyester yarns of fabrics subject to this bathochromic shift. It is believed that any dye containing active hydrogens will undergo this reaction to some degree.

One catalyst-inhibitor system which may cause a bathochromic shift of dye color is a system comprising a combination of organic or inorganic salts of manganese and cobalt with acetyl triisopropyl titanate and a phosphate ester. This catalyst-inhibitor system, however, has the advantage of producing polyester polymer at high production rates with good color (whiteness) and excellent stability against thermooxidative, hydrolytic and ultraviolet radiation effects. Filament yarn spun from polymer produced by this system also gives high production efficiency (small number of roll wraps) and leaves very little deposit on spinneret faces.

It is an object of this invention to overcome deficiencies of the above mentioned catalyst system while maintaining the high production rate, good color and excellent stability against thermooxidative, hydrolytic and ultraviolet radiation degradation effects.

It is a further object of this invention to provide a new and improved process for producing poly(ethylene terephthalate) which overcomes the disadvantages of prior art processes, pointed out hereinbefore, and produces a product of improved properties at a fast rate of reaction.

It is another object of this invention to provide a new catalyst-inhibitor system which accelerates ester interchange and polycondensation and produces poly(ethylene terephthalate) having excellent color.

It is a still further object of this invention to provide a new catalyst-inhibitor system which will minimize bathochromic shift of dye color during dyeing or during subsequent yarn or fabric treatment while maintaining a high production rate, good color, excellent stability against thermooxidative, hydrolytic, and ultraviolet radiation effects.

Other objects and advantages of the present invention will be apparent from the description thereof hereinafter.

It is emphasized tha the particular catalyst system of this invention, while enjoying the advantages of the system set forth in Ser. No. 576,415, also simultaneously improves the polycondensation rate when it is desired to post-polymerize the polymer from about 0.60 to a higher inherent viscosity via solid state polymerization techniques. The detail of this unexpected activity is set forth in Example 27 of this specification.

The objects of the present invention are accomplished by conducting the ester interchange reaction between dimethyl terephthalate and ethylene glycol in the presence of a catalytic amount of a combination of organic or inorganic salts of manganese and cobalt with a titanium alkoxide and an antimony compound and subsequently adding a phosphate ester before polycondensation of the product of the ester interchange reaction. Examples of suitable manganese salts are manganous benzoate tetrahydrate, manganese chloride, manganese oxide, manganese acetate, manganese acetylacetonate, manganese succinate, manganese diethyldithiocamate, manganese antimonate, manganic phosphate monohydrate, manganese glycoloxide, manganese naphthenate and manganese salicyl salicylate.

Examples of suitable cobalt salts are cobaltous acetate trihydrate, cobaltous nitrate, cobaltous chloride, cobalt acetylacetonate, cobalt naphthenate and cobalt salicyl salicylate.

Examples of useful titanium alkoxides are acetyl triisopropyl titanate, titanium tetraisopropoxide, titanium glycolates, titanium butoxide, hexyleneglycol titanate, tetraisooctyl titanate, and the like.

Examples of some suitable antimony compounds useful in this invention are antimony metal or metal alloys; antimony III and V halides, hydroxides and sulfides; antimony III, IV and V oxides; antimony salts of carboxylic acids as acetate, lactate, oxalate, phthalate, benzoate, or mixtures thereof; antimony III and V glycolates; antimony alcoholates as

where $R_1$, $R_2$ and $R_3$ are alkyl or cycloalkyl radicals which may include inert substituents. When $R_1$, $R_2$, or $R_3$ is alkyl, it may be straight chain or branched, for example a methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl or octadecyl radical. Preferred alkyl radicals are those containing less than 8 carbon atoms. When $R_1$, $R_2$ or $R_3$ is cycloalkyl, it may, for example, be a cyclopentyl, cyclohexyl, cycloheptyl or cyclooctyl radical. Examples of inert substituents in $R_1$, $R_2$ or $R_3$ are alkoxy, halogen, nitro and ester groups. Typical substituted alkyl radicals are 3-chloropropyl, 2-ethoxyethyl and carboethoxymethyl radicals, examples of substituted cycloalkyl radicals are 4-methylcyclohexyl and 4-chlorocyclohexyl radicals; also useful are alkyl antimonites such as phenyl, tolyl, or butyl antimonites; metal antimonates such as magnesium antimonate or sodium antimonate; and divalent metal antimonites such as magnesium, manganese, zinc, calcium or cobalt antimonites.

In the preparation of poly(ethylene terephthalate), by means of the ester-interchange reaction, the process comprises two steps. In the first step, ethylene glycol and dimethyl terephthalate are reacted at elevated temperatures and atmospheric pressure or above atmospheric pressure to form bis-2-hydroxyethyl terephthalate (BHET) and methanol, which is removed. Thereafter the BHET is heated under still higher temperatures and under reduced pressure to form poly(ethylene terephthalate) with the elimination of glycol, which is readily volatilized under these conditions and removed from the system. The second step, or polycondensation step, is continued until a fiber-forming polymer having the desired degree of polymerization, determined by inherent viscosity, is obtained. Without the aid of a suitable catalyst, the above reactions do not proceed at a noticeable rate.

Inherent viscosity is determined by measuring the flow time of a solution of known polymer concentration and the flow time of the polymer solvent in a capillary viscometer with a 0.55 mm. capillary and a 0.5 mm. bulb having a flow time of 100 ± 15 seconds and then by calculating the inherent viscosity using the equation:

Inherent Viscosity (I.V.), $n_{0.50\%}{}^{25°}$ PTCE $$\text{Inherent Viscosity (I.V.), } n\,{}^{25°}_{0.50\%\ PTCE} = \frac{\ln \frac{t_s}{t_o}}{C}$$

where:
$\ln$ = Natural logarithm
$t_s$ = Sample flow time
$t_o$ = Solvent blank flow time
C = Concentration in grams per 100 ml. of solvent
PTCE = 60% phenol, 40% tetrachloroethane
The basic method is set forth in ASTM D2857-70.

The method used for calculating catalyst metal concentrations in poly(ethylene terephthalate) for purposes of this specification may be illustrated as follows.

The poly(ethylene terephthalate) is prepared in 0.60 gram mole batches. The polymer's repeat unit empirical formula is $C_{10}H_8O_4$, and its gram molecular weight thus is 192.16 g. A 0.60 mole batch is, therefore, 115.30 g. A 0.60 mole batch of polymer requires 0.60 mole of terephthalic acid or its alkyl esters such as dimethyl terephthalate (DMT; mol. wt. = 194.19). Thus, 0.60 mole of this "acid fraction" as DMT is determined to be:

$$0.60 \text{ mole} \times 194.19 \text{ g./mole} = 116.51 \text{ g.}$$

Catalyst metals levels are reported in parts by weight of metal per million parts by weight of DMT. Thus, 48 ppm Ti is determined as $$0.60 \text{ mole} \times \frac{194.19 \text{ g./mole}}{1,000,000} \times 48 = 0.00559267 \text{ g. Ti}$$

The weight of other catalyst metals or other additives is calculated similarly.

Depending upon the polymer production rate, the catalyst mix feed rate may be varied to provide the desired catalyst level within the range specified by any specific metal, as for 20–60 ppm Ti, for instance. Likewise, depending upon the required catalyst mix feed rate, the concentrations of various components may be adjusted to provide the desired metal to metal ratios in the range of ratios in parts by weight set forth in this specification, i.e., the range of ratios in parts by weight of Mn/Co/Sb/Ti includes the ranges 25-110 Mn/10-100 Co/50-300 Sb/20-60 Ti in parts by weight. Thus, as an example, a catalyst mix designed to contain 0.025 weight percent Ti and metal to metal ratios of 90 Mn/18 Co/72 Sb/ 56 Ti in an ethylene glycol solvent may be prepared according to the following recipe:
 99.451 Wt. % Ethylene Glycol
 0.257 Wt. % Manganese Benzoate Tetrahydrate
 0.034 Wt. % Cobalt Acetate Trihydrate
 0.0788 Wt. % Antimony Triacetate
 0.179 Wt. % Acetyl Triisopropyl Titanate This invention involves conducting the ester interchange reaction in the presence of a catalyst system comprising a mixture of a titanium alkoxide such as acetyl triisopropyl titanate and organic or inorganic salts of manganese and cobalt and an antimony compound. The manganese salt should be present in the amount of 25-110 ppm manganese; cobalt salt should be present in the amount of 10-100 ppm cobalt; the titanium should be present in the amount of 20-60 ppm titanium; and the antimony compound should be present in the amount of 50-300 ppm of antimony. All parts by weight are based on the acid fraction of the polymer weight to be produced. The preferred manganese salt is manganous benzoate tetrahydrate and the preferred cobalt salt is cobaltous acetate trihydrate. The preferred antimony compound is antimony triacetate.

After the ester interchange reaction a phosphate ester is added to the reaction product and the reaction product is polycondensed. The preferred phosphate ester has the formula

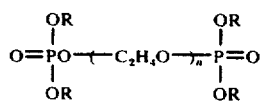

wherein n has an average value of 1.5 to about 3.0 with about 1.8 being most preferred and each R is hydrogen or an alkyl radical having from 6 to 10 carbon atoms with octyl being most preferred, the ratio of the number of R groups of hydrogen atoms to the number of phosphorus atoms being about 0.25 to 0.50 with about 0.35 being most preferred; and the ester having a free acidity equivalent of about 0.2 to 0.5, the ester being present in the amount to provide phosphorus in the amounts of 13–240 parts per million based on the acid fraction of the polyester to be produced. Other phosphate esters useful in this invention include ethyl acid phosphate, diethyl acid phosphate, triethyl acid phosphate, aryl alkyl phosphates, tris-2-ethylhexyl phosphate and the like.

The phosphate ester may be used in an amount to provide phosphorus at a concentration such that the atom ratio of the amount of phosphorus to the sum of the amounts of cobalt, manganese, and titanium is between 1.0 and 2.0, i.e., $$1.0 \leq \frac{[P]}{[Mn] + [Co] + [Ti]} \leq 2.0$$

where [ ] in each case refers to the number of gram atoms of respective components. (Gram atoms of any element = weight of the element in grams ÷ the atomic weight of the element in grams.)

The process and catalyst-inhibitor system of this invention provides for the manufacture at high production rates of high quality poly(ethylene terephthalate) polyester having excellent properties for the fabrication of fibers and films. Poly(ethylene terephthalate) produced in accordance with this invention has excellent color (whiteness), low concentration of diethylene glycol (ether linkages), excellent stability against thermooxidative, hydrolytic, and ultraviolet radiation degradation effects, and when melt spun into fibers or filaments results in essentially no deposits on spinneret faces and which will minimize bathochromic shift of dye color during dyeing. Further, the polymer made using this novel catalyst-inhibitor system is also characterized by improved solid state polymerization activity.

The data set forth in the following examples illustrate these effects.

The invention will be further illustrated by the following examples although it will be understood that these examples are included merely for purposes of illustration and are not intended to limit the scope of the invention.

Table 1

| Properties of Poly(ethylene terephthalate) Made with Various Catalyst Systems | | | | | |
|---|---|---|---|---|---|
| Example | Catalyst System (ppm[1]) | I.V.[2] | % DEG[3] | CEG[4] | CDM Color[5] |
| 1 | (65)Zn-(230)Sb-(31)P | .60 | 1.08 | 29 | 1.9 |
| 2 | *(48)Ti-(62)P | .72 | 1.30 | 25 | 4.9 |
| 3 | (12)Mg-(48)Ti-(62)P | .72 | 0.67 | 17 | 5.2 |
| 4 | **(48)Ti-(62)P | .62 | 1.18 | 20 | 4.7 |
| 5 | (236)Mn-(374)Sb-(44)P | .64 | 0.70 | 24 | 5.1 |
| 6 | **(50)Mn-(48)Ti-(50)P | .71 | 0.62 | 13 | 6.5 |
| 7 | **(50)Mn-(60)Ti-(20)Co-(80)P | .58 | 0.52 | 8 | 3.1 |
| 8 | **(70)Mn-(60)Ti-(20)Co-(80)P | .61 | 0.50 | 20 | 2.6 |
| 9 | **(76)Mn-(48)Ti-(13)Co-(17)Li-(74)P | .61 | 1.00 | 26 | 4.5 |
| 10 | **(63)Mn-(58)Ti-(13)Co-(28)Li-(98)P | .61 | 1.20 | 18 | 1.3 |
| 11 | **(21)Ti-(40)Mn-(10)Co-(16)Li-(75)P | .61 | 0.92 | 17 | −0.9 |
| 12 | **(25)Ti-(44)Mn-(15)Co-(19)Li-(97)P | .63 | 0.87 | 12 | −0.8 |
| 13 | **(29)Mn-(44)Ti-(13)Co-(72)Sb-(75)P | .63 | 1.02 | 21 | −0.5 |

*Ti as titanium tetraisopropoxide.
**Ti as acetyl triisopropyl titanate.
[1]Ppm metal based on polyester acid fraction.
[2]Inherent viscosity of 0.5 g./100 ml of 60/40 (w/w) phenol/tetrachloroethane at 25° C.
[3]Diethylene glycol, wt. percent.
[4]Carboxyl end groups, milliequivalents/Kg.
[5]Yellowness value determined by Gardner Color Difference Meter.

The poly(ethylene terephthalate) polymers shown in Examples 1–13 of Table 1 were prepared as follows:

EXAMPLE 1

(65) Zn - (230) Sb - (31) P Catalyst - A ten mole ester interchange reaction was run by weighing 1942 g. (10.0 moles) dimethyl terephthalate (DMT) and 1390 g. (22.4 moles) ethylene glycol (EG) into a 5000 ml reactor flask equipped with a mechanical stirrer, thermometer well, and a packed distillation column such that methyl alcohol is permitted to distill from the reactor system, but the EG is refluxed within the system. A weighed amount of zinc acetate dihydrate [Zn(CH₃CO₂)₂.2H₂O, M.W. 219] and antimony triacetate [Sb(CH₃CO₂)₃, M.W. 299] were added to the reaction mixture so as to provide 65 ppm Zn and 230 ppm Sb based on the weight of the DMT fraction. Heat was applied and the temperature of the reaction mixture was permitted to rise as the reaction proceeded and methanol was distilled off. Heat was removed when the theoretical amount of methanol (20.0 moles) had been recovered and the temperature of the reaction mixture had leveled off. Weighed amounts of the ester interchange reaction product were transferred to 500 ml reactor flasks in which the polycondensation reactions were then carried out. Subsequent to transferring the ester interchange reaction product to 500 ml reactor flasks and prior to heating up for the polycondensation reactions, the desired amount of the phosphate ester described earlier in this specification was added to the reaction mixture. (The phosphate ester may be weighed in directly or may be added volumetrically, having first been dissolved in a suitable solvent such as EG, n-butyl alcohol, methanol, etc.) Thus, the phosphate ester was added as a solution in n-butyl alcohol in an amount to provide 31 ppm P based on the weight of the DMT fraction of the ester interchange reaction product. (Other additives of interest such as stabilizers, delusterants, etc., may also be added at this time if desired).

The polycondensation reactor was then heated by immersing in a molten metal bath regulated at 275 ± 2° C., the reactor system having first been flushed with dry nitrogen, and the reactor system was maintained under a dry nitrogen blanket until placed under vacuum.

The polycondensation reactor was equipped with a mechanical stirrer having suitable seals and with a system for condensing and collecting the excess EG removed during the polycondensation reaction and with suitable connections to permit evacuation of the reactor system during the polycondensation reaction. Thus, the polycondensation reactions were run at 275 ± 2° C. and <0.3 mm Hg absolute pressure for sufficient time (usually 1–2 hours) as to permit the inherent viscosity (I.V.) of the polyester to reach a level of 0.58 or higher. (This time varies depending upon the activity of the catalyst.)

EXAMPLE 2

(48) Ti – (62) P (TI as titanium tetraisopropoxide) — These polymers were prepared by the same procedures as described in Example 1 except that titanium catalyst was used, and the phosphate ester was added at the start of the ester interchange reaction instead of at the end of same. Titanium was added as a solution of titanium tetraisopropoxide [Ti(OCH(CH$_3$)$_2$)$_4$, M.W. 284] in n-butyl alcohol in an amount to provide 48 ppm Ti based on the weight of the DMT fraction of the ester interchange reaction mixture. The phosphate ester was added as a solution in n-butyl alcohol in an amount to provide 62 ppm P based on the weight of the DMT fraction of the ester interchange reaction mixture.

EXAMPLE 3

(12) Mg – (48) Ti — (62) P Catalyst — These polymers were prepared by the same procedures as described in Example 2 except that a magnesium-titanium-n-butoxide Meerwein complex was used. The magnesium-titanium-n-butoxide Meerwein complex, prepared as described in U.S. Pat. No. 2,720,502, was added as a solution in n-butyl alcohol in an amount to provide 48 ppm Ti based on the weight of the DMT fraction of the ester interchange reaction mixture.

EXAMPLE 4

(48) Ti — (62) P (Ti as acetyl triisopropyl titanate) — Acetyl triisopropyl titanate [CH$_3$COO-Ti(OCH(CH$_3$)$_2$)$_3$, M.W. 284] was prepared by adding slowly with stirring and cooling and under a dry atmosphere glacial acetic acid (CH$_3$COOH, M.W. 60) to titanium tetraisopropoxide in an amount to provide a 1/1 molar ratio of acetic acid/titanium tetraisopropoxide. (The isopropyl alcohol thus displaced by the acetic acid was not removed.) This catalyst may be added to the ester interchange reaction mixture undiluted or as a solution in any of a number of suitable solvents such as n-butyl alcohol, methyl alcohol, ethylne glycol, etc.

Thus, these polymers were prepared by the same procedures as described in Example 2 except that titanium was added as a solution of acetyl triisopropyl titanate (ATIP) in n-butyl alcohol in an amount to provide 48 ppm Ti based on the weight of the DMT fraction of the ester interchange reaction mixture. Abovesaid phosphate ester was added as a solution in n-butyl alcohol in an amount to provide 62 ppm P based on the weight of the DMT fraction of the ester interchange reaction mixture.

Thus the results listed in Table 1 for the above four catalyst systems are averages of three polycondensation reactions run on the product of each of the four ester interchange reactions.

EXAMPLE 5

(236) Mn — (374) Sb — (44) P Catalyst — This polymer was prepared by a continuous melt phase process on production scale polyester manufacturing equipment. Thus, manganese benzoate tetrahydrate [Mn(O$_2$CC$_6$H$_5$)$_2$.4H$_2$O, M.W. 369] and antimony triacetate, were metered continuously as solutions, separately or combined in one solution, in a suitable solvent or solvents to said polyester production unit at such a rate as to provide 236 ppm Mn and 374 ppm Sb based on the weight of product polyester. The above said phosphate ester was likewise metered continuously to said production unit at a point after the ester interchange reaction section of said unit as a solution in a suitable solvent and at a rate such as to provide 44 ppm P based on the weight of product polyester.

EXAMPLE 6

(50) Mn — (48) Ti — (50) P (Ti as acetyl triisopropyl titanate) - These polymers were prepared as described in Example 1, except that a Mn-Ti-P catalyst system was used. Manganese benzoate tetrahydrate was added as a solution in EG to the ester interchange reaction mixture in an amount to provide 50 ppm Mn based on the weight of the DMT fraction. Acetyl triisopropyl titanate (ATIP) was added as a solution in n-butyl alcohol in an amount to provide 48 ppm Ti based on the DMT fraction of the ester interchange reaction mixture. Abovesaid phosphate ester was added as a solution in EG to the product of the ester interchange reaction in an amount to provide 50 ppm P based on the weight of the DMT fraction of said reaction product and prior to the polycondensation of said product. The polycondensation reactions were run as described in Example 1. Thus, these results are averages of three such polycondensation reactions.

EXAMPLES 7 and 8

(50) Mn - (60) Ti - (20) Co - (80) P
(70) Mn - (60) Ti - (20) Co - (80) P (Ti as ATIP)

These polymers were prepared by running the ester interchange reaction and the polycondensation reaction consecutively in the 500 ml reaction flasks described in Example 1. Thus 116.4 g. (0.6 mole) DMT and 93.0 g. (1.5 moles) EG were placed in said reaction flask. To this mixture was added titanium as ATIP, manganese benzoate tetrahydrate, cobalt acetate trihydrate [Co(OOCCH$_3$)$_2$.3H$_2$O, M.W. 231], all in separate EG solutions, or alternatively in one combined EG solution in the amounts necessary to provide the indicated levels of catalyst metals based on the weight of the DMT fraction of the said ester interchange reaction mixture. Additionally, the aforesaid phosphate ester was added as a solution in EG in an amount to provide the indicated 80 ppm P based on the weight of the DMT fraction of said ester exchange reaction mixture.

The reactor flask was subsequently immersed in a molten metal bath regulated at 195 ± 2° C. with a dry nitrogen atmosphere maintained in the reactor flask, and the ester interchange reaction was run for such time as required to recover the theoretical amount of methyl alcohol (1.2 moles). The temperature of the metal bath was then raised to 275 ± 2° C., the reactor system placed under vacuum, and the polycondensation reaction run as described in Example 1.

EXAMPLES 9 and 10

(76) Mn — (48) Ti — (13) Co — (17) Li — (74) P
(63) Mn — (58) Ti — (13) Co — (28) Li — (98) P

The polymers were prepared by a continuous melt phase process on polyester manufacturing equipment. Manganese benzoate tetrahydrate, in an ethylene glycol solution, acetyl triisopropyl titanate in an ethylene glycol solution, cobalt acetate trihydrate in an ethylene glycol solution, and lithium acetate dihydrate in an ethylene glycol solution were metered continuously as solutions, separately or combined in one solution, to the polyester production equipment at such a rate as to provide 76 ppm Mn; 48 ppm Ti; 13 ppm Co; and 17 ppm Li based on the weight of product polyester. The phosphate ester (described in Example 1) was metered continuously to the production unit at a point after the ester interchange reaction section of the unit as an ethylene glycol solution such as to provide 74 ppm P based on the weight of product polyester. The procedure was repeated for the system of (63) Mn — (58) Ti — (13) Co — (28) Li and (98) P changing only the amounts of catalyst stabilizer components as indicated.

The properties of the polymers produced are set forth in Table 1, Examples 9 and 10, respectively.

EXAMPLES 11 and 12

(40) Mn — (21) Ti — (10) Co — (16) Li — (75) P
(44) Mn — (25) Ti — (15) Co — (19) Li — (97) P

The polymers were prepared by a continuous melt phase process on polyester manufacturing equipment. Manganese benzoate tetrahydrate, in an ethylene glycol solution, acetyl triisopropyl titanate in an ethylene glycol solution, cobalt acetate trihydrate in an ethylene glycol solution, and lithium acetate dihydrate in an ethylene glycol solution were metered continuously as solutions, separately or combined in one solution, to the polyester production equipment at such a rate as to provide 40 ppm Mn; 21 ppm Ti; 10 ppm Co; and 16 ppm Li based on the weight of product polyester. The phosphate ester (described in Example 1) was metered continuously to the production unit at a point after the ester interchange reaction section of the unit as an ethylene glycol solution such as to provide 75 ppm P based on the weight of product polyester. The procedure was repeated for the system of (44) Mn — (25) Ti — (15) Co — (19) Li and (97) P changing only the amounts of catalyst stabilizer components as indicated.

EXAMPLE 13

(29) Mn — (44) Ti — (13) Co — (72) Sb — (75) P

The polymer was prepared by a continuous melt phase process on polyester manufacturing equipment. Manganese benzoate tetrahydrate in an ethylene glycol solution, acetyl triisopropyl titanate in an ethylene glycol solution, cobalt acetate trihydrate in an ethylene glycol solution, and antimony triacetate in an ethylene glycol solution were metered continuously as solutions, separately or combined in one solution, to the polyester manufacturing equipment at such a rate as to provide 29 ppm Mn, 44 ppm Ti, 13 ppm Co, and 72 ppm Sb based on the weight of product polyester. The phosphate ester (described in Example 1) was metered continuously to the manufacturing equipment at a point after the ester interchange reaction section of the unit as an ethylene glycol solution such as to provide 75 ppm P based on the weight of product polyester. The properties of the polymer produced are set forth in Table 1, Example 13.

Table 2

| Thermo-oxidative Stability of PET Made With Various Catalysts | | |
|---|---|---|
| Ex. | Catalyst System (ppm[1]) | Thermo-oxidative Stability[2] |
| 14 | (100)Ca-(12)Co-(286)Sb-(190)P | 1.000* |
| 15 | (99)Zn-(217)Sb-(281)P | 2.89** |
| 16 | (53)Mn-(353)Sb-(170)P | 1.876 |
| 17 | (76)Mn-(132)Sb-(25)P | 1.323 |
| 18 | (119)Mn-(10)Co-(292)Sb-(170)P | 1.278 |
| 19 | (113)Mn-(35)Co-(269)Sb-(130)P | 1.043 |
| 20 | (15)Mg-(60)Ti-(120)P | 3.103 |
| 21 | (50)Mn-(60)Ti-(20)Co-(80)P[3] | 0.930 |
| 22 | (72)Mn-(48)Ti-(16)Co-(20)Li-(118)P[3] | 0.530 |
| 23 | (62)Mn-(36)Ti-(14)Co-(18)Li-(108)P[3] | 0.590 |
| 24 | (40)Mn-(21)Ti-(10)Co-(16)Li-(75)P[3] | 0.634 |
| 25 | (44)Mn-(25)Ti-(15)Co-(19)Li-(97)P[3] | 0.630 |
| 26 | (29)Mn-(44)Ti-(13)Co-(72)Sb-(75)P[3] | 0.971 |

*Standard to which all other results are normalized.
**Normalized percent crosslinker (thermo-oxidation) product). Percent crosslinker correlates with percent weight loss (see 2).
[1]Ppm metal based on wt. of polymer.
[2]Percent weight loss of pressed films after 6 hours at 300° C. in air circulating oven. All results are normalized by dividing percent weight loss by the percent weight lost by the standard.
[3]Ti as acetyl triisopropyl titanate.

The poly(ethylene terephthalate) polymers set forth in Examples 14–26 Table 2 were prepared as follows:

EXAMPLE 14

(100) Ca — (12) Co — (286) Sb — (190) P — This polymer was a commercially available product manufactured by Teijin, Ltd., which was made using this catalyst-inhibitor system. The polymer is used as an arbitrary standard in thermo-oxidative stability studies.

EXAMPLE 15

(99) Zn — (217) Sb — (281) P — This polymer was produced as described in Example 5, except that the phosphate ester was added by blending 50.0 g. of the polymer pellets with the required amount of phosphate ester in 25 ml. of dry benzene ($C_6H_6$, M.W. 78) to provide 281 ppm of P based on the weight of polyester. The benzene was then evaporated off under vacuum, and the coated pellets dried and then extruded on a Brabender Plasticorder to obtain homogeneous mixing of the said phosphate ester.

EXAMPLE 16

(53) Mn — (353) Sb — (170) P — This polymer was prepared using procedures described in Example 1.

EXAMPLE 17

(76) Mn — (132) Sb — (25) P — This polymer was produced as described in Example 5.

EXAMPLES 18 and 19

(119) Mn — (10) Co — (292) Sb — (170) P
(113) Mn — (35) Co — (269) Sb — (130) P

These polymers were prepared as described in Example 7 except that the phosphate ester was coated on the polymer as follows: the polymer was ground through a 2 mm screen and then 20 g. were blended with a sufficient amount of said phosphate ester in 50 ml of dichloromethane ($CH_2Cl_2$, M.W. 85) to give the indicated levels of P (ppm based on the weight of polyester). The dichloromethane was then evaporated off under vacuum.

EXAMPLE 20

(15) Mg — (60) Ti — (120) P — This polymer was produced by a continuous melt phase process described in Example 5.

EXAMPLE 21

(50) Mn — (60) Ti — (20) Co — (80) P — This polymer was prepared as described in Example 7.

EXAMPLES 22 and 23

(72) Mn — (48) Ti — (16) Co — (20) Li — (118) P

(62) Mn — (36) Ti — (14) Co — (18) Li — (108) P

These polymers were prepared by the procedure described in Examples 9 and 10.

EXAMPLES 24 and 25

(40) Mn — (21) Ti — (10) Co — (16) Li — (75) P
(44) Mn — (25) Ti — (15) Co — (19) Li — (97) P

These polymers were prepared by the procedure set forth in Examples 11 and 12.

EXAMPLE 26

(29) Mn — (44) Ti — (13) Co — (72) Sb — (75) P — The polymer was prepared using the procedure described in Example 13.

Table 3

| Effect of Catalyst-Inhibitor Systems on Color Shift of Dyed Yarn | | |
|---|---|---|
| Catalyst System (ppm[1]) | I.V.[2] | Heat Set Color Shift, Δ K/S |
| (80)Mn-(56)Ti-(22)Co-(99)P | 0.61 | b |
| (80)Mn-(48)Ti-(15)Co-(84)P | 0.56 | b |
| (90)Mn-(56)Ti-(18)Co-(23)Li-(134)P | 0.53 | a |
| (56)Mn-(65)Ti-(18)Co-(13)Li-(73)P | 0.57 | 0.0130, c |
| (40)Mn-(22)Ti-(15)Co-(67)P | 0.54 | 0.0254, b |
| (51)Mn-(57)Ti-(19)Co-(100)Na-(64)P | 0.63 | 0.0014, c |
| (236)Mn-(374)Sb-(44)P | 0.65 | a |
| (40)Mn-(21)Ti-(10)Co-(16)Li-(75)P | 0.63 | a |
| (44)Mn-(25)Ti-(15)Co-(19)Li-(97)P | 0.63 | a |
| (84)Mn-(73)Sb-(69)Ti-(19)Co-(123)P | 0.608 | a |
| (47)Mn-(112)Sb-(28)Ti-(18)Co-(112)P | 0.49 | 0.0039(a) |
| (44)Mn-(143)Sb-(50)Ti-(18)Co-(58)P | 0.62 | a |
| (50)Mn-(94)Sb-(52)Ti-(10)Co-(67)P | 0.59 | a |

[1]Ppm metal based on polyester polymer.
[2]Inherent viscosity of 0.5 g/100 ml of 60/40 (w/w) phenol/tetrachloroethane at 25° C.
[a]Color shift after heat set treatment equal to or better than the control by visual comparison.
[b]Color shift compared to the control is too great for acceptance by visual comparison.
[c]Acceptable.

The data set forth in Table 3 particularly illustrates the effects of antimony when used with Mn—Co—Ti—P systems as to bathochromic color shift of dyed yarn. The polymers were made in the manner shown in Examples 7 and 8 for the Mn-Co-Ti-P system and in Examples 9 and 18 for the Mn—Ti—Co—Sb—P system. The polymer made using the Mn—Ti—Co—Na—P system was run in the manner described in Examples 7 and 8, the sodium being added as sodium acetate (anhydrous) in an ethylene glycol solution.

The K/S value used is determined by use of color measurement with a spectrophotometer. The spectrophotometer can be used to measure the percent diffuse reflectance of a sample for a given wavelength from 800 to 380 nm. The K/S term is the ratio of the absorptivity coefficient (K) to the scattering coefficient (S) and is related to the diffuse reflectance (R) as follows:

$$K/S = \frac{(1-R)^2}{2R}$$

Further K/S = k $\log_{10}$ Conc., but if the dyeing level of all samples is maintained constant (in the table above the dyeing level was 0.3% by weight) then an observed color shift in a dyed sample manifests itself as a change in the constant k. The term Δ K/S was chosen to represent the change in K/S which occurred upon heat-setting of certain dyed polyester samples as set forth above. Diffuse reflectance was measured at 620 nm for each sample before and after heatsetting. The respective K/S values were calculated, and the difference, K/S heatset minus K/S nonheatset, is reported as Δ K/S. The equipment used in a Spectrosystem 100 Spectrophotometer sold by Cary Instruments of Monrovia, California.

EXAMPLE 27

Set forth in the table below are data showing the effect of the catalyst system of this invention in improving the solid state polycondensation rate of poly(ethylene terephthalate) in comparison to the catalyst system disclosed in U.S. Pat. No. 3,907,754 and in application Ser. No. 576,415, of which this application is a continuation-in-part. The data in the table below are obtained by the following procedure.

A small sample of polymer pellets (as produced) is crystallized by heating for 30 minutes in an oven at 180° C. under a nitrogen blanket. A 2 gram sample of the crystalline pellets is then placed in a test tube which is then evacuated to an absolute pressure of <0.2 mm. Hg. The test tube is then placed in an aluminum heat block regulated at 240° C. After 18 hours in the heat block, the test tube is removed and allowed to cool to room temperature while remaining under vacuum. The vacuum is relieved and the sample removed for inherent viscosity (I.V.) determination. The final I.V. is compared to the starting I.V. as a measure of solid state activity. The average polycondensation rate over the test period may then be expressed as change in I.V. per hour.

$$\Delta I.V./Hr. = \frac{\text{Final I.V.} - \text{Initial I.V.}}{\text{Time (Hrs.)}}$$

Note the increased activity of the polymer produced using the catalyst system of this invention (item 6).

Table

| Item No. | Catalyst System* | Initial I.V. | Final I.V. | ΔI.V./Hr. |
|---|---|---|---|---|
| 1 | (82)Mn-(24)Co-(82)Ti-(100)P | 0.62 | 1.06 | 0.024 |
| 2 | (92)Mn-(24)Co-(80)Ti-(102)P | 0.60 | 1.03 | 0.024 |
| 3 | (65)Mn-(10)Co-(34)Ti-(23)Li-(105)P | 0.58 | 0.92** | 0.019 |
| 4 | (60)Mn-(8)Co-(56)Ti-(21)Li-(76)P | 0.58 | 0.98** | 0.022 |
| 5 | (64)Mn-(34)Ti-(78)P | 0.64 | 1.04 | 0.022 |
| 6 | (32)Mn-(72)Co-(28)Ti-(244)Sb-(122)P | 0.61 | 1.14 | 0.029 |

*Parts per million of metal based on polymer weight.
**Average of two runs.

Although the invention has been described in considerable detail with particular reference to certain preferred embodiments thereof, variations and modifications can be effected within the spirit and scope of the invention.

We claim:

1. Process for producing poly(ethylene terephthalate) comprising reacting dimethyl terephthalate and ethylene glycol at a temperature sufficient to effect ester interchange and in the presence of a catalyst system comprising a mixture of salts of manganese and cobalt with a titanium alkoxide and an antimony compound, the manganese salts being present in the amount of about 25–110 ppm Mn, the cobalt salts being present in the amount of about 10–100 ppm Co, the titanium alkoxide being present in the amount of about 20–60 ppm Ti, and the antimony compound being present in the amount of about 50–300 ppm Sb, all parts by weight based on the acid fraction of the polyester.

2. Process of claim 1 wherein said manganese salt is selected from manganous benzoate tetrahydrate, manganese chloride, manganese oxide, manganese acetate, manganese acetylacetonate, manganese succinate, manganese diethyldithiocamate, manganese antimonate, manganic phosphate monohydrate, manganese glycoloxide, manganese naphthenate and manganese salicyl salicylate.

3. Process of claim 1 wherein said cobalt salt is selected from cobaltous acetate trihydrate, cobaltous nitrate, cobaltous chloride, cobalt acetylacetonate, cobalt naphthenate and cobalt salicyl salicylate.

4. Process of claim 1 wherein said titanium alkoxide is selected from acetyl triisopropyl titanate, titanium tetraisopropoxide, titanium glycolates, titanium butoxide, hexylene glycol titanate and tetraisooctyl titanate.

5. Process of claim 1 wherein said antimony compound is selected from antimony metal or metal alloys; antimony III and V halides, hydroxides and sulfides; antimony III, IV and V oxides; antimony salts of carboxylic acids; antimony III and V glycolates; antimony alcoholates

where $R_1$, $R_2$, and $R_3$ are alkyl or cycloalkyl radicals which may include inert substituents; alkyl antimonites; metal antimonates and divalent metal antimonites.

6. Process of claim 1 wherein the said manganese salt is manganous benzoate tetrahydrate and the cobalt salt is cobaltous acetate trihydrate, the titanium alkoxide is acetyl triisopropyl titanate and the antimony compound is antimony triacetate.

7. Process of claim 1 wherein a phosphate ester is added to the reaction product of the ester interchange and said reaction product is polycondensed, said phosphate ester being present in the amount of about 13 to 240 ppm P based on the acid fraction of the polyester.

8. Process of claim 7 wherein said phosphate ester is selected from ethyl acid phosphate, diethyl acid phosphate, triethyl acid phosphate, aryl alkyl phosphate, tris-2-ethylhexyl phosphate and a phosphate ester having the formula

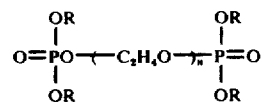

wherein $n$ has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5.

9. Process of claim 1 wherein a phosphate ester is added to the reaction product of the ester interchange and said reaction product is polycondensed, said phosphate ester having the formula

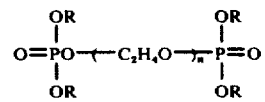

wherein $n$ has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5, said ester being present in the amount to provide phosphorus in the amount of 13 to 240 ppm P based on the acid fraction of the polyester.

10. Process of claim 6 wherein a phosphate ester is added to the reaction product of the ester interchange and said reaction product is polycondensed, said phosphate ester being present in the amount of about 13–20 ppm P based on the acid fraction of the polyester.

11. Process of claim 10 wherein said phosphate ester is selected from ethyl acid phosphate, diethyl acid phosphate, triethyl acid phosphate, aryl alkyl phosphate, tris-2-ethylhexyl phosphate and a phosphate ester having the formula

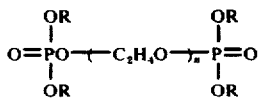

wherein n has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5.

12. Process of claim 6 wherein said phosphate ester has the formula

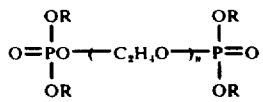

wherein n has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5, said ester being present in the amount to provide phosphorus in the amount of 13–240 ppm P based on the acid fraction of the polyester.

13. Catalyst system comprising a mixture of manganese salts and cobalt salts with a titanium alkoxide and an antimony compound, the manganese salts being present in the amount of about 25–110 parts by weight Mn, the cobalt salts being present in the amount of about 10–100 parts by weight Co, the titanium alkoxide being present in the amount of about 20–60 parts by weight Ti, and the antimony compound being present in the amount of about 50–300 parts by weight Sb.

14. Catalyst system of claim 13 wherein said manganese salt is selected from manganous benzoate tetrahydrate, manganese chloride, manganese oxide, manganese acetate, manganese acetylacetonate, manganese succinate, manganese diethyldithiocamate, manganese antimonate, manganic phosphate monohydrate, manganese glycoloxide, manganese naphthenate and manganese salicyl salicylate.

15. Catalyst system of claim 13 wherein said cobalt salt is selected from cobaltous acetate trihydrate, cobaltous nitrate, cobaltous chloride, cobalt acetylacetonate, cobalt naphthenate and cobalt salicyl salicylate.

16. Catalyst system of claim 13 wherein said titanium alkoxide is selected from acetyl triisopropyl titanate, titanium tetraisopropoxide, titanium glycolates, titanium butoxide, hexylene glycol titanate, and tetraisooctyl titanate.

17. Catalyst system of claim 13 wherein said antimony compound is selected from antimony metal or metal alloys; antimony III and V halides, hydroxides and sulfides; antimony III, IV and V oxides; antimony salts of carboxylic acids; antimony III and V glycolates; antimony alcoholates as

where $R_1$, $R_2$ and $R_3$ are alkyl or cycloalkyl radicals which may include inert substituents; alkyl antimonites; metal antimonates; and divalent metal antimonites.

18. Catalyst system for the production of poly(ethylene terephthalate) comprising in catalytic amounts, in combination, salts of manganese, cobalt and an antimony compound with a titanium alkoxide and a phosphate ester.

19. Catalyst system of claim 17, wherein said salts are manganous benzoate tetrahydrate, cobaltous acetate trihydrate, antimony triacetate, and the titanium alkoxide is acetyl triisopropyl titanate.

20. Catalyst system of claim 13 including a phosphate ester, said phosphate ester being selected from ethyl acid phosphate, diethyl acid phosphate, triethyl acid phosphate, aryl alkyl phosphate, tris-2-ethylhexyl phosphate, and a phosphate ester having the formula

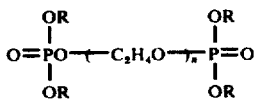

wherein n has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5, said ester being present in the amount of about 13 to 240 parts by weight P.

21. Catalyst system of claim 18 wherein said phosphate ester has the formula

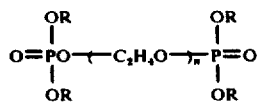

wherein n has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5.

22. Catalyst system of claim 18, wherein the components of the system are present in parts by weight metal levels of about 25–110 Mn; about 10–100 Co; about 20–60 Ti; about 50–300 Sb; and about 13–240 P.

* * * * *